United States Patent [19]
Miller et al.

[11] 3,864,479
[45] Feb. 4, 1975

[54] BOROMYCIN AS A COCCIDIOSTAT

[75] Inventors: Brinton M. Miller, Middletown; Richard W. Burg, Murray Hill, both of N.J.

[73] Assignee: Merck & Co., Inc., Rahway, N.J.

[22] Filed: Feb. 28, 1974

[21] Appl. No.: 446,875

[52] U.S. Cl. .............................................. 424/185
[51] Int. Cl. ...................... A61k 21/00, A61k 27/00
[58] Field of Search ..................................... 424/185

[56] References Cited
OTHER PUBLICATIONS
Pache et al., Chem. Abst., Vol. 71 (1969), page 58069m.

*Primary Examiner*—Sam Rosen
*Attorney, Agent, or Firm*—Francis H. Deef; J. Jerome Behan; Edmunde D. Riedi

[57] ABSTRACT

Boromycin and its salts are active anticoccidial agents. They are included in compositions useful for the prevention and treatment of coccidiosis in poultry.

3 Claims, No Drawings

BOROMYCIN AS A COCCIDIOSTAT

SUMMARY OF THE INVENTION

This invention relates generally to the usefulness of boromycin for the treatment and prevention of coccidiosis in susceptible animals especially in fowl, and particularly in poultry. In addition, this invention relates to compositions including said boromycin as the active ingredient, intimately admixed with an inert carrier for administration to animals infected with coccidia. It is, therefore, an object of this invention to provide a method of treatment for coccidiosis using boromycin. It is also an object of this invention to include boromycin in compositions for administration to poultry which compositions are employed to treat coccidiosis. As used herein, the term "treat" includes administration to animals which have developed active symptoms of coccidiosis, as well as animals without overt symptoms, but that have been exposed to causative organisms. Further objects will become apparent upon a further reading of the description.

Coccidiosis is a common and widespread animal disease caused by several species of protozoan parasites of the genus Eimeria. In chickens, implicated species include *E. tenella*, *E. necatrix*, *E. acervulina*, *E. maxima*, *E. hagani*, and *E. brunetti*. *E. tenella* is the causative agent of a severe and often fatal infection of the caeca, which is manifested by severe and extensive hemorrhage, accumulation of blood in the caeca, and the passage of blood in the droppings. *E. acervulina* attacks the small intestine of the chick causing what is known as intestinal coccidiosis. Related species of coccidia such as *E. meleagridis* and *E. adenoides* are causative organisms of coccidiosis in turkeys. When left untreated, the severe forms of coccidiosis lead to poor weight gain, reduced feed efficiency and mortality in fowl. The elimination or control of this disease is, therefore, of paramount importance to the poultry raising industry.

Boromycin is an ionophoric macrolide and methods for obtaining it are disclosed in South African Pat. No. 66/5860 issued June 3, 1967. There are included in this invention those salts of boromycin which can be formed by neutralizing the boromycin with a weak base such as sodium bicarbonate or potassium bicarbonate or other such weak bases having a monovalent anion to form the sodium, potassium or like salt, and which are physiologically acceptable.

Boromycin and its salts as hereinabove described, when used as anticoccidial agents are administered orally as a component of the animal feedstuff in the drinking water, in salt blocks, and in unit dosage forms such as tablets, boluses, or drenches; or parenterally either in solution or in suspension in an aqueous medium. The vehicle in which the boromycin anticoccidial agent is distributed is an inert edible carrier or diluent. By an inert edible carrier or diluent is meant one that is nonreactive with respect to the boromycin compound and that may be administered with safety to the animals to be treated. The carrier or diluent is preferably one that is or may be an ingredient of the animal feed.

Thus, the preferred embodiment of this invention are the compositions containing the above boromycin compounds which may be successfully employed to treat coccidiosis when administered to animals susceptible to coccidiosis preferably as a component of their feed, although it may also be given dissolved or suspended in the drinking water. According to a preferred aspect of the invention, novel compositions for the treatment of coccidiosis are provided which comprise boromycin or a salt thereof intimately dispersed in or intimately admixed with an inert carrier or diluent.

The compositions which are a preferred feature of this invention are the so-called feed premixes in which a boromycin compound, i.e., boromycin or a salt thereof is present in relatively large amounts and which are suitable for addition to the poultry feed either directly or after an intermediate dilution or blending step. Examples of carriers or diluents suitable for such compositions are animal feed ingredients such as distillers' dried grains, corn meal, citrus meal, fermentation residues, ground oyster shells, Attapulgus clay, wheat shorts, molasses solubles, corn cob meal, edible vegetable substances, toasted dehulled soya flour, soybean mill feed, antibiotic mycelia, soya grits, crushed limestone and the like. The boromycin compound is intimately dispersed or admixed throughout the solid inert carrier by methods such as grinding, stirring, milling, or tumbling. By selecting proper diluents and by altering the ratio of carrier to active ingredient, compositions of any desired concentration may be prepared. Formulations containing from about 1 to about 40% by weight and preferably from about 2–25% by weight, of a boromycin compound are particularly suitable for addition to poultry feedstuffs. Those having from about 5–20% by weight of coccidiostat are very satisfactory. The active compound is usually dispersed or mixed uniformly in the diluent but in some instances may be sorbed on the carrier. Since it is convenient for the feed manufacturer to use about one pound of feed supplement for each ton of finished feed, the preferred concentration in the supplement is usually a function of the level of active ingredient desired in the finished feed.

For treating poultry, the feed supplement is uniformly dispersed in the animal feed by suitable mixing or blending procedures.

Usually the feed supplements are further diluted with materials such as corn meal or soybean meal before being incorporated in the animal feed. In this intermediate processing step, the level of the boromycin compound in the carrier is brought down to about 0.1 to 1.0% by weight. This dilution serves to facilitate uniform distribution of the coccidiostat in the finished feed. The finished feed is one that contains a source of fat, protein, carbohydrate, minerals, vitamins, and other nutritional factors.

Very low levels of a boromycin compound in an animal feed are sufficient to afford good protection against coccidiosis in a susceptible animal. Preferably, the compound is administered in an amount equal to about 0.003 to 0.025% by weight of the feed. Optimum results are obtained by feeding at a level of about 0.006 to 0.0125% by weight of the finished feed. For therapeutic treatment of an established coccidial infection, higher amounts of boromycin or a salt thereof, i.e., up to about 0.05% by weight of the feed consumed, can be employed. The most advantageous dosage level will, of course, vary somewhat with particular circumstances such as the type and severity of the coccidial infection to be treated.

The above concentrations are described on the basis of crystalline material, that is, material which is substantially pure. It is to be understood that an equivalent amount of boromycin activity can be obtained by employing less pure material derived from various stages of a boromycin fermentation including whole culture, filtered beer or mycelia. For example, the filtered beer can without further purification be spray dried directly into the inert carrier. When employing such a source of boromycin activity, the material used must be assayed and the quantity employed be factored so it is equivalent to the above referred to concentrations.

In the above discussion of this invention, emphasis has been placed on solid compositions wherein the active ingedient is mixed with an edible carrier in a feed supplement, in a so-called premix or in the final feedstuff. This is the preferred method of administering the boromycin or its salt. An alternate method of treatment is to dissolve or suspend the boromycin compound in the drinking water of the animals. The quantity of boromycin anticoccidial agent which may be administered in this fashion is, of course, limited by the solubility of the product in water or by the quantity that may be suspended in the water without undue settling. Emulsifiers or surface active agents may be employed for this latter purpose.

This invention is not limited to anticoccidial compositions having boromycin type compounds as the sole active ingredient. Also contemplated within its scope is what might be called "combined treatment" where a boromycin compound and one or more other anticoccidials are administered concurrently. For such purposes, compositions may be prepared containing a boromycin compound admixed with one or more other coccidiostats such as sulfaquinoxaline, other sulfa compounds, 4,4'-dinitrocarbanilide-2-hydroxy-4,6-dimethylpyrimidine complex, 3,3'-dinitrodiphenyldisulfide, 5-nitrofurfural semicarbazone, amprolium, zoalene, buquinolate, ethopabate and the like.

It will likewise be understood by those skilled in this art that special feed supplement formulations and finished animal feeds containing vitamins, antibiotics, growth-promoting agents and other nutritional substances may include a boromycin compound of this invention. A feed supplement of this type is the following:

| Ingredient: | Amount/lb. of Supplement, grams |
|---|---|
| Riboflavin | 0.64 |
| DL-calcium pantothenate | 2.10 |
| Niacin | 3.67 |
| Choline chloride | 50.00 |
| Vitamin $B_{12}$ concentrate | 1.30 mg. |
| Procaine penicillin | 0.84 |
| Vitamin A (100,000 u./g.) | 3.38 |
| Vitamin $D_3$ (200,000 u./g.) | 0.68 |
| Arsanilic acid | 18.36 |
| Butylated hydroxy toluene | 23.15 |
| DL-methionine | 23.15 |
| Boromycin | 23.00 |
| Distillers' grains to 1 pound. | |

Animal feed premixes having the following compositions are prepared by intimately mixing the boromycin compound and the particular edible solid diluent or diluents:

| | | lbs. |
|---|---|---|
| A. | Boromycin | 12.5 |
| | Distillers' dried grains | 87.5 |
| B. | Boromycin | 15.0 |
| | Soya mill feed | 45.0 |
| | Fine soya grits | 40.0 |
| C. | Boromycin | 5.0 |
| | Molasses solubles | 95.0 |
| D. | Boromycin | 15.0 |
| | Corn distillers' grains | 55.0 |
| | Corn germ meal | 30.0 |

These supplements and premixes are made by mechanical milling or mixing of the ingredients to insure uniform distribution of the active compound and are then added to feed in such an amount that the concentration of boromycin or its salt is as hereinbefore specified.

The following examples are presented in order to illustrate this invention and should not be construed as limitative of the invention.

EXAMPLE I

*E. acervulina* chicken assay

Three 11-day-old female white leghorns, weighing between 75 to 90 gm. each are maintained on a vitamin supplemented diet (Pennfield 190) containing the sample to be tested. One day later, each chicken is orally inoculated with $4 \times 10^5$ sporulated oocysts of E. acervulina and maintained on the same diet for five more days. Weights of each of the birds are recorded on days 1, 3, 5, 6 and 7 during the assay; the rate of weight gains during days 1 to 5 ($B_1$) is a parameter of drug toxicity, whereas growth rate from day 5 to day 7 ($B_2$) reflected the E. acervulina infection. The internal duodenal lesions of each chicken are also examined.

The results are set forth below in Table I:

TABLE I

| | | Normal Control | Non-Medicated Infected Control | % Boromycin Na Salt in Feed | | |
|---|---|---|---|---|---|---|
| | | | | 0.024 | 0.012 | 0.006 |
| A. | Response | — | — | Active | Active | Moderately Active |
| | Lesion Score | 0 | 4 | 0 | 0 | 1 |
| | Weight | +39 | +12 | +3 | +- | +- |
| B. | Response | — | — | Active | Active | Active |
| | Lesion Score | 0 | 4 | 0 | 0 | 0 |
| | Weight | +42 | +22 | −11 | +29 | +38 |

EXAMPLE II

*E. tenella* chicken assay

Straight run white leghorn chicks, in groups of three each, are weighed and placed in cages with wire floors. They are fed, *ad libitum*, a standard laboratory ration in which graded concentrations of test chemicals are blended just prior to use. Nicarbazin and amprolium are used as the reference standard. The normal and infected birds are fed basal ration. On the second day of the test, the chicks were each orally inoculated with 50,000 sporulated oocysts of *Eimeria tenella*. Papers under cages are examined on 6th, 7th and 8th days of assay for presence or absence of bloody droppings. A score of 0 is given if no bloody spots were observed.

TABLE II

|  | Normal Control | Non-Medicated Infected Control | % Boromycin Na Salt in Feed | | |
|---|---|---|---|---|---|
|  |  |  | 0.024 | 0.012 | 0.006 |
| A. Response Bloody Droppings Plus | — | — | Active | Active | Inactive |
| Lesion Score | 0 | 23 | 0 | 1 | 16.5 |
| Weight | +28 | +19 | –1 | +14 | +41 |
| B. Response Bloody Droppings Plus | — | — | Active | Active | Inactive |
| Lesion Score | 0 | 28 | 1 | 5 | 26 |
| Weight | +28 | +22 | –1.5 | +32 | +22 |

Number of bloody droppings per three birds are counted. On the 7th day of assay, the surviving birds are weighed, killed and examined for cecal coccidiosis lesions. Normal ceca are scored 0 and ceca with detectable, slight, moderate and maximal lesions are scored 1, 2, 3 and 4, respectively. When a bird dies and cecal coccidiosis lesions are present, a score of 4 is recorded and the mortality noted.

A maximum infected bird has a score of 36 or more. Fully active is assigned a score 0 to 6, and moderately active is assigned a score of 7 to 12. However, if a coccidiosis mortality is noted and the other birds score 6 or more, the test compound is considered inactive.

The results are summarized in Table II below:

What is claimed is:

1. A method for treating coccidiosis in poultry which comprises orally administering to an animal susceptible to coccidiosis an anticoccidially effective amount of a compound selected from the group consisting of boromycin or a salt thereof.

2. A method according to claim 1 in which said compound is admixed with an inert carrier in the amount of 0.003 to 0.025% by weight.

3. A method according to claim 1 in which said compound is admixed with an inert carrier in the amount of from 0.006 to 0.0125% by weight.

* * * * *